United States Patent [19]

Fan et al.

[11] 4,241,343

[45] Dec. 23, 1980

[54] DISPLAY APPARATUS

[75] Inventors: George J. Fan, Ossining; Richard L. Garwin, Scarsdale; James L. Levine, Yorktown Heights; Janusz S. Wilczynski, Ossining, all of N.Y.

[73] Assignee: International Business Machines Corporation, Armonk, N.Y.

[21] Appl. No.: 934,779

[22] Filed: Aug. 18, 1978

Related U.S. Application Data

[63] Continuation of Ser. No. 755,886, Dec. 30, 1976, abandoned.

[51] Int. Cl.[3] .................... G06F 3/14

[52] U.S. Cl. .................... 340/755; 340/762; 340/378.4; 358/205; 358/231

[58] Field of Search .................... 340/755, 762, 378.4; 358/205, 231

[56] References Cited

U.S. PATENT DOCUMENTS

| | | | |
|---|---|---|---|
| Re. 29,094 | 12/1976 | Price | 358/231 |
| 2,298,045 | 10/1942 | Ehrenhaft | 352/119 |
| 2,588,740 | 3/1952 | Malm | 358/231 |
| 2,967,246 | 1/1961 | Ostergren | 315/39.63 |
| 3,563,643 | 2/1971 | Jeney | 324/7.2 |
| 3,621,138 | 11/1971 | McNaney | 178/15 |
| 3,651,258 | 3/1972 | Ammann | 178/15 |
| 3,656,175 | 4/1972 | Carlson et al. | 346/76 L |
| 3,668,409 | 6/1972 | Tuhro et al. | 250/236 |
| 3,709,117 | 1/1973 | Sansone | 178/15 |
| 3,746,421 | 7/1973 | Yoder | 350/6.4 |
| 3,776,995 | 12/1973 | Little, Jr. | 264/219 |
| 3,781,078 | 12/1973 | Wildhaber | 350/6.3 |
| 3,785,713 | 1/1974 | Walles | 350/6.3 |
| 3,828,124 | 8/1974 | Baum | 358/205 |
| 3,829,192 | 8/1974 | Wheeler | 350/6.8 |
| 3,846,007 | 11/1974 | Flogaus et al. | 350/6.91 |
| 3,846,784 | 11/1974 | Sinclair | 340/755 |
| 3,958,235 | 5/1976 | Duffy | 340/755 |
| 4,099,172 | 7/1978 | Montanari | 340/762 |

OTHER PUBLICATIONS

*Laser Display Technology*, Baker, 12/78, IEEE Spectrum, pp. 39-50.

*Experimental Laser Display*, 1/66, Texas Instruments Bull. No. DLA-1324.

*A Scanned GaAsP Display System*, Eales IEE Conf. Publ. #80, pp. 103-108, 1971.

*Primary Examiner*—Marshall M. Curtis

*Attorney, Agent, or Firm*—Alvin J. Riddles

[57] ABSTRACT

A display apparatus may be constructed by imparting motion to the light from a small light source to give the appearance of a line, causing the light to be "off" and "on" as desired during traverse of a line length, using as many light sources as needed for a two-dimensional display and precorrecting the light timing to compensate for the apparent change in movement rate during the motion.

3 Claims, 7 Drawing Figures

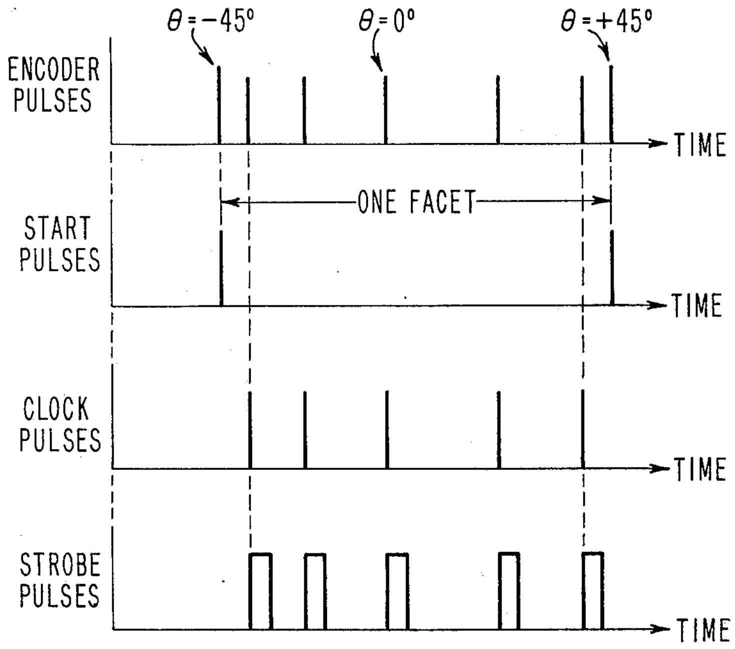
FIG. 4
FIG. 5
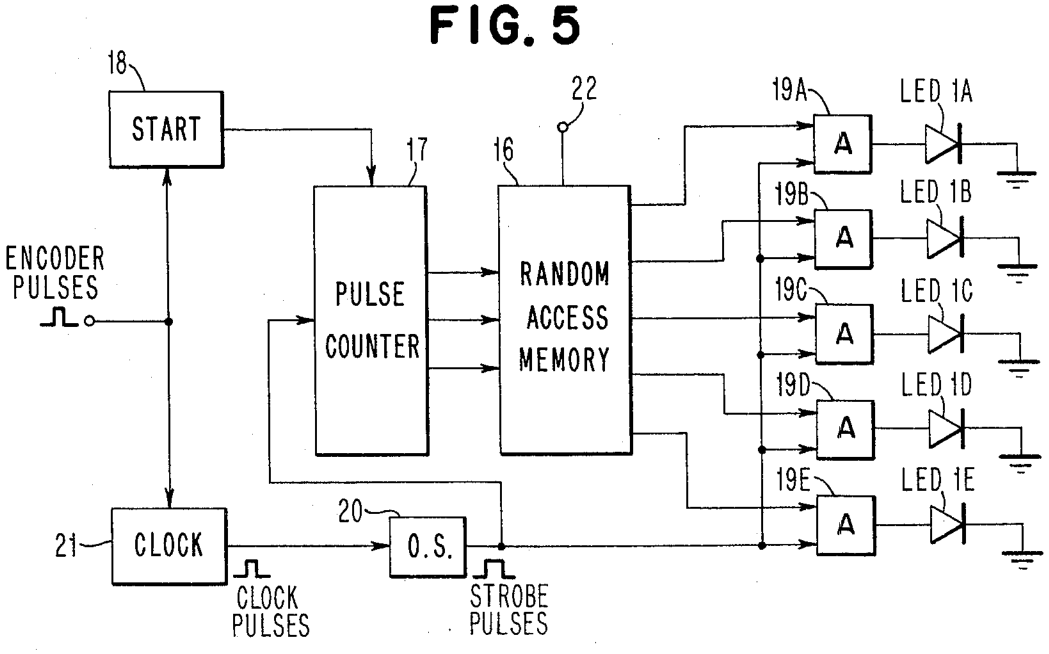

DISPLAY APPARATUS

This is a continuation of application Ser. No. 755,886 filed Dec. 30, 1976, now abandoned.

BACKGROUND OF THE INVENTION

In constructing displays there has been a tradeoff between costly high detail arrays wherein a separate light source is provided for each point and the use of a single line of light sources and a uniformly and continuously rotating mirror which, while it reduces the number of light sources needed, the displayed image is subject to the disadvantages of distortion from the rotating mirror which gives a concave appearance and narrowness of the display field which limits the height of the object displayed.

SUMMARY OF THE INVENTION

Displays may be constructed by imparting motion to the light from a source so that the source appears as a line, the line may then appear to be broken into segments by interrupting the light source and then through a combination of the use of repeated light sources in a line and coordinated light interruptions of each source, a two-dimensional display free of distortion is achieved.

DESCRIPTION OF THE DRAWING

FIG. 4 is a schematic diagram of the relative timing employed in connection with FIG. 3.

FIG. 5 is a schematic diagram of the wiring involved in FIG. 3.

DETAILED DESCRIPTION

The invention employs the image retentive capability of the human eye, the ability to rapidly turn on and off certain types of light sources and relative motion to provide to the human eye the appearance of a two-dimensional image. This is accomplished by providing motion in one dimension to the light from a light source that can be turned "off" and "on" rapidly and then turning the light off and on selectively during the motion cycle. The result is that a point of light traverses the appearance of a line and the line in turn is broken up into selectable segments. Where a series of small light sources are positioned in a line orthogonal to the motion direction and then the lights are coordinated in their "on" and "off" times, a two-dimensional image will be displayed.

Figure 1:
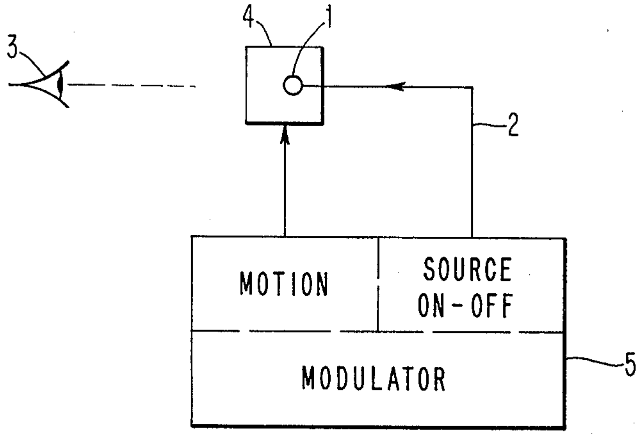
FIG. 1 is a functional schematic diagram of the relationship of an observer to the elements of the invention.

Referring to FIG. 1 there is shown a schematic of the elements of the invention. In FIG. 1 a light source 1 is supplied with power so that it can be selectively interrupted through a control element 2. The light from the source 1 is caused to have the appearance to an observer 3 of moving linearly by the introduction of motion through element 4. Element 4 may be motion apparatus applied directly to the source itself, or in instances where it is desirable to have the light source stationary, the element 4 may be a mirror with oscillatory angular motion or with cyclical linear motion or preferably may be a refractive member that bends the light beam so that when the refractive member goes through a motion cycle the source 1 appears to the observer 3 to trasverse a line. A modulating means 5 is provided to correlate the time "on" and "off" of the source 1 with the position of the motion cycle. The result is the capability to produce the appearance of selectively displayed segments of a line. The segments may be made to appear smaller and smaller by shortening the relationship of the "on" and "off" times to the cylce of the motion, limited to exceed the size of the source.

The light source must be susceptible to being turned "on" and "off" with little afterglow so that only parts of the motion cycle can be illuminated and it should be physically small enough to pack in a line or in a quasi linear array that looks reasonably continuous. For example, a zig-zag line. A solid state light source such as a light emitting diode or electroluminescent device meets these criteria.

Figure 2A:
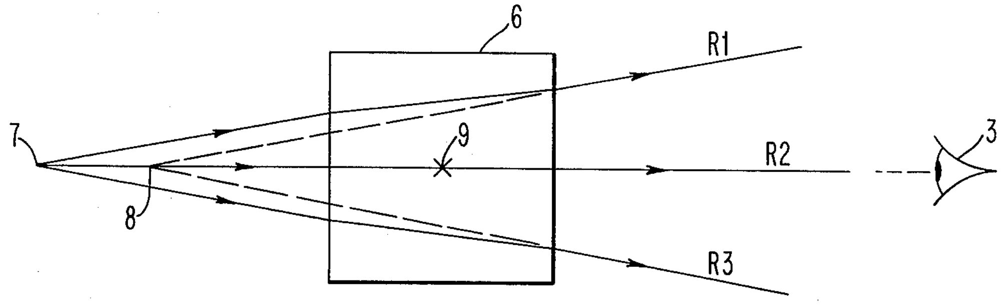
FIGS. 2A, B and C is an illustration of the interrelation of motion with switching "off" and "on" of the source in producing the appearance of light segments.
Figure 2B:
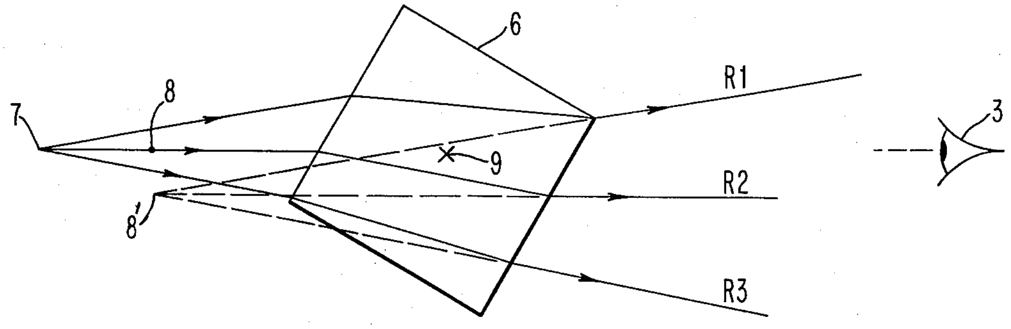
Figure 2C:
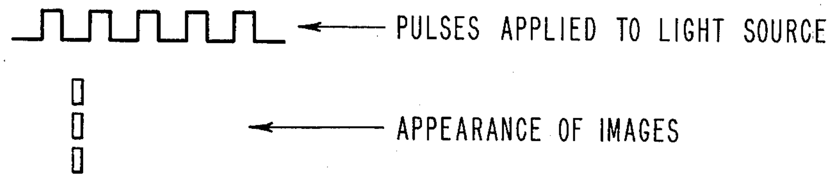

Referring next to FIG. 2 the role of a refractive member in the motion is illustrated in greater detail. FIGS. 2A and 2B illustrate the operation of a prism 6 with parallel faces. FIG. 2A shows three typical light rays R1, R2, and R3 which are emitted from point source 7 and refracted at the left surface of prism 6 according to Snell's Laws of Optics. They traverse the prism and exit at the right face where they are again refracted. Each ray leaves with its original direction but displaced as shown. The emerging rays appear to originate at point 8, as illustrated by the dashed lines. Thus, the source will appear to observer 3 as a virtual image located at position 8. Although we have illustrated the optics with a point source, the method is correct for an extended source which may be considered to be made up of many point sources.

FIG. 2B illustrates the situation with the prism rotated about the axis 9 in FIGS. 2A and 2B. The virtual image is now located at 8', which is seen to be displaced from the previous position. The latter is shown as point 8 in FIG. 2B for comparison. The displacement is primarily in the vertical direction, the horizontal displacement being small in comparison for practical values of the refractive index. Equation 1 gives the vertical displacement of image 8 with practical accuracy when the observer is located at a distance from the scanner which is large in comparison with the dimensions of the latter. Thus, turning the source at 7 "on" and "off" as illustrated by the sequence of 3 pulses in FIG. 2C will produce the sequence of three line segments illustrated in that figure.

Some flexibility is available in the selection of the refractive member. It is necessary only that there be two sides with a geometric relationship such that there be a displacement of a beam of light passing in one and out the other. For a given overall diagonal dimension, a four-sided prism will provide the largest display field with the field becoming smaller as the number of prism sides increases.

It should also be noted that where rotation is used for the motion, the position of points in the line of the apparent image does not vary linearly with respect to degrees of rotation and hence provision must be made for this fact in the "on" and "off" switching of the light source.

Figure 3:
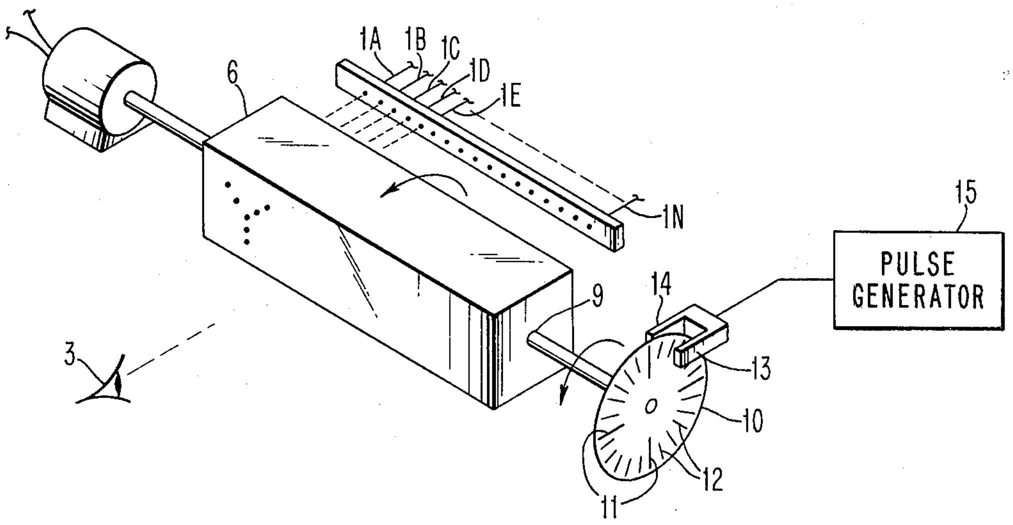
FIG. 3 is a schematic view of a rotating prism embodiment of the invention.

Referring next to FIG. 3 a view is shown of a rotating light emitting diode display embodiment of the invention. The display is made up of an array of light emitting diode light sources 1A–1N mounted in closely adjacent relationship in a line. The solid state light emitting diode has a number of advantages as a light source in that it is sufficiently small that a number can be packed closely together thereby yielding better detail in the horizontal dimension of the display. The light emitting diode device also has the property that the transition from "off" to "on" and from "on" to "off" is very close to instantaneous. This quality permits greater detail in the vertical dimension of the display. The motion is provided by rotation of a four-sided refractive prism 6 wherein each beam of light from each light emitting diode 1A–1N is caused to appear to the observer 3 as a line and that line can be interrupted. An example illustration is provided in the form of five light emitting diodes which produce the appearance of the alphabetic character Y.

In order to correlate the rotational motion with the light interruption it is necessary to provide a series of signals non-uniformly spaced in time as light passes through each face in turn. The rotation of the member 6 displaces the apparent location of the elements 1A–1N in the vertical direction according to the relationship of Equation 1, when the entrance and exit faces are parallel. Equation 1:

$$Y = T \text{ Sin } \theta \; 1 - \frac{\text{Cos } \theta}{\sqrt{N^2 - \text{Sin}^2\theta}}$$

where
Y is the displacement
T is the thickness of the refractive member 6.
N is the index of refraction and
$\theta$ is the rotation angle.

The rotation angle $\theta$ increases linearly with time, hence Equation 2:

$$\theta = 2\pi ft.$$

where f is the rotational frequency and t is time.

For a four-sided square prism, four complete vertical scans occur per rotation, one per side. Since an image is generated by pulsing the light emitting diodes at an appropriate time, the pusling sequence is repeated once per side of the member 6. Persistence of vision will give the appearance of a steady image when the rotation rate f is sufficiently high. A rotation rate of 15 per second or 900 RPM provides a flicker frequency of 60 per second which is adequate for most purposes. For ease in viewing about 60 complete images per second will avoid a flicker effect in the display.

A frequency close to but unequal to the power line frequency which is usually 60 cycles per second may cause annoying low frequency beats in background illumination because lighting and particularly fluorescent lighting is modulated at harmonics of the power line frequency of 60 cycles. It is thus desirable, where rotating motion is employed, to rotate with a synchronous motor running at a phase locked frequency harmonically related to the power line frequency. For example, a 900 RPM synchronous motor is satisfactory.

The vertical height of the display is in accordance with the following expression: Equation 3:

$$H = 2 \text{ YMax}$$

In Equation 3 YMax is given by Equation 1 evaluated at the maximum anlge which is about 40 degrees for a four-sided square prism. H is about 0.56 T for a material with a refractive index of 1.5. Under these circumstances, angles in excess of 40 degrees result in multiple images because of internal reflections. In practice a somewhat smaller view than the full vertical height has desirable advantages to allow for movement on the part of the observer 3.

For image quality the "on" strobe period of the light emitting diodes should be evenly spaced with respect to the vertical direction and such spacing should be approximate to the spacing in the horizontal direction. Similarly it is also desirable that the images generated from each side of the refractor 6 should coincide closely. The degree of achievement of these goals is a matter primarily of tradeoff between apparatus complexity and fuzziness of image. The fuzzier image that can be tolerated, the less precise the controls need be.

Referring next to FIG. 4 an embodiment of a timing relationship for the apparatus of FIG. 3 is shown. The Figure has four timing charts all to the same time scale equal to the time of traverse of one side of the refractor 6 in FIG. 3. In FIG. 3 on the same shaft of rotation about the axis 9 is mounted a timing member 10 which may, for example, be a translucent disk having opaque marks 11 evenly spaced which identify each face of the refractor 6. Since the member 6 is square, there are four. Within the space on the timing member 10 between the face indicator marks 11 there are a number of encoder pulse marks 12 which will control the starting times of the "on" periods of the light emitting diodes.

From Equation 1, it will be noted that the displacement is a non-linear function of rotation angle $\theta$ and hence time so that the strobe pulses cannot be generated with equal spacing. The spacing will be farthest apart when the face of the member 6 is closest to vertical, $\theta = 0$, and will be closest together as the limits of the useful viewing angle through the prism are reached. The encoder marks 12 are placed on the timing disk 10 for each face of the member 6 in positions determined by Equation 1. While five encoder marks 12 per prism 6 face are shown between face edge marks 11, it will be apparent that, as set forth previously, as the number increases or decreases, the detail possible in the image varies.

The marks are sensed by providing a light source 13 and a light detector 14 that generate the timing signals labelled in FIG. 4 as "encoder" pulses that in turn permit a pulse generator 15 to provide the shaped timed pulses set forth in the section of FIG. 4 labelled "strobe" pulses.

Referring to FIGS. 4 and 5, the generation of the alphabetic character Y, illustrated as an example in connection with the embodiment of FIG. 3, is set forth. Note that the image in this Figure is shown for clarity as appearing in front of the prism; it is in fact located somewhat behind the prism, as should be clear from FIG. 2. The alphabetic Y may be displayed by using five light emitting diodes and five strobe pulses positioned as set forth in the timing chart of FIG. 4.

The function circuit diagram of FIG. 5 contains a random accesss memory 16 organized as five words of five bits each as set forth in Table 1.

TABLE 1

| Bit1 | Bit2 | Bit3 | Bit4 | Bit5 | |
|---|---|---|---|---|---|
| 1 | 0 | 0 | 0 | 1 | ADDRESS 0 |
| 0 | 1 | 0 | 1 | 0 | ADDRESS 1 |
| 0 | 0 | 1 | 0 | 0 | ADDRESS 2 |
| 0 | 0 | 1 | 0 | 0 | ADDRESS 3 |
| 0 | 0 | 1 | 0 | 0 | ADDRESS 4 |

It will be apparent that where the pattern of Table 1 is used to power the light emitting diodes 1A–1E for a portion of the motion cycle the image retentiveness of the human eye will produce the alphabetic character Y as illustrated in FIG. 3.

The timing and operation of the random access memory is controlled by pulse counter 17 which is a three-bit binary counter. The counter receives two inputs, a first one that clears the counter when each prism face arrives at the position corresponding to the top of the display area, and a second input that counts the encoder pulses and advances the address of memory 16. The pulses which clear the pulse counter 17 for each face are labelled "start" pulses in FIG. 4. These pulses are selected from the encoder pulses by circuit 18 of FIG. 5, labelled "start". This may be accomplished, for example, by having the face indicator marks 11 of disc 10 wider than the encoder marks 12. Similarly, circuit 21 of FIG. 5 labelled "clock", selectively detects the encoder pulses to produce the pulse sequence of FIG. 4 labelled "clock pulses". The clock pulses in turn trigger single-shot multivibrator 20 to produce the pulses labelled "strobe pulses" of FIG. 4. The duration of these pulses controls the on-time of the light emitting diodes as set forth in connection with the description of FIG. 5 to follow, and hence determines the blurring of the images. The falling edges of the strobe pulses are used to advance pulse counter 17.

Referring to FIG. 5, each bit of the addressed word in memory 16 is applied to one input of an associated AND gate (19A–19E). The other inputs are driven in common by the strobe pulses. The outputs of the AND gates are connected to light emitting diodes 1A–1E. After a start pulse is detected, the pulse counter will be cleared and the bit pattern stored in ADDRESS 0 of memory 16, will be applied to the AND gates. The outputs of the AND gates will remain at zero until the first encoder pulse triggers the generation of a strobe pulse. The light emitting diodes corresponding to logical "ones" in the stored pattern in ADDRESS 0 will then be lit (diodes 1A and 1E in this case) for the duration of the strobe pulse. At the end of the strobe pulse, the pulse counter will advance, and the bit pattern of ADDRESS 1 will be applied to the AND gates. The next strobe pulse will then light diodes 1B and 1D. Similarly, only diode 1C will be lit during the third, fourth and fifth strobe pulses. The entire sequence will repeat once per scanner face, producing a flicker-free image of the character Y. The random access memory 16 may be loaded with any desired pattern to be displayed with techniques well known in the art through a schematic input labelled 22. It will be clear to one skilled in the art in the light of the principles set forth that complete flexibility of subject matter can be entered into an appropriate storage member and displayed.

While the above embodiment is set forth in rudimentary terms to provide a starting place to assist one skilled in the art in practicing the invention it will be apparent that various extensions are possible in the light of the principles set forth. For example, by such means as linear motion of light source or by appropriate choice of angle of prism faces with respect to axis of rotation of the refractor it is possible to have light sources appear as segments in several lines.

What has been described is a technique for imparting motion to the light from a single, small, rapid "off" and 37 on" response, light source to provide the appearance to an observer of a line of light, modulating "off" and "on" periods of the light source with the motion to produce the appearance of line of light segments and coordinating the output of a series of such light sources mounted in a line orthogonal to the line of motion to produce a display.

What is claimed is:

1. In visual apparatus of the type wherein a two-dimensional display is produced through giving the appearance of cyclical motion to the virtual image of the light from each member of a row of lights by passing the light through a rotating prism and selectively turning each light "on" and "off" during portions of said motion in accordance with a pattern to be displayed;

the distortion compensating improvement comprising:

means for precorrecting light signal "on" and "off" timing apparatus synchronized with rotation of said prism said precorrecting apparatus including sensible means angularly spaced with respect to said virtual image travel during passage of a facet of said prism to accommodate for the apparent change inmovement rate of said virtual image to the eye of the observer as said image traverses portions of said cyclical motion.

2. The apparatus of claim 1 wherein said synchronization of said light signal apparatus means is mounted on the shaft of rotation of said prism.

3. The apparatus of claim 2 wherein said precorrecting signal means is optically sensible marks.

* * * * *